US008510385B1

(12) United States Patent
Najm et al.

(10) Patent No.: US 8,510,385 B1
(45) Date of Patent: *Aug. 13, 2013

(54) SYSTEM AND METHOD FOR USER POLLING OVER A NETWORK

(75) Inventors: Clovis Najm, Vancouver (CA); Chi-Hao Chiang, Vancouver (CA); Patrick Audley, Vancouver (CA)

(73) Assignee: Mobio Technologies, Inc., Vancouver, BC (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/554,399

(22) Filed: Jul. 20, 2012

Related U.S. Application Data (63) Continuation of application No. 13/538,858, filed on Jun. 29, 2012.

(51) Int. Cl.
*G06F 15/16* (2006.01)
*H04N 7/173* (2011.01)
*H04M 11/00* (2006.01)

(52) U.S. Cl.
USPC ........... 709/205; 709/206; 725/24; 379/92.02

(58) Field of Classification Search
USPC ............... 709/205, 206; 725/24, 86, 87, 135, 725/136; 705/12; 379/92.01–92.02
See application file for complete search history.

(56) References Cited

U.S. PATENT DOCUMENTS

| | | | |
|---|---|---|---|
| 5,878,399 A | 3/1999 | Peralto | 705/12 |
| 6,799,723 B2 | 10/2004 | Kotob et al. | 235/386 |
| 6,947,966 B1 | 9/2005 | Oko, Jr. et al. | 709/203 |
| 7,831,455 B2 | 11/2010 | Yoshida et al. | 705/7 |
| 8,122,061 B1 | 2/2012 | Guinness | 707/802 |
| 8,229,093 B2 | 7/2012 | Martin | |
| 2003/0042305 A1 | 3/2003 | Jacobs et al. | 235/386 |
| 2005/0101307 A1* | 5/2005 | Brugge et al. | 455/414.1 |
| 2008/0222191 A1* | 9/2008 | Yoshida et al. | 707/102 |
| 2008/0313026 A1 | 12/2008 | Rose et al. | |
| 2010/0076829 A1* | 3/2010 | Bishop | 705/14.15 |
| 2011/0161148 A1* | 6/2011 | Schmidt | 705/14.16 |
| 2012/0011540 A1* | 1/2012 | Pulford | 725/32 |

(Continued)

OTHER PUBLICATIONS

Walsh et al. "Experience with an Object Reputation System for Peer-to-Peer Filesharing." Proceedings of the 3rd Symposium on Networked Systems Design and Implementation (NSDI '06) [online], May 8-10, 2006 [retrieved on Nov. 5, 2012]. Retrieved from the Internet <URL: http://static.usenix.org/event/nsdi06/tech/walsh/walsh_html/>.

*Primary Examiner* — Jeong S Park
(74) *Attorney, Agent, or Firm* — Nixon Peabody LLP (57) ABSTRACT

User polling associated with an interactive broadcasting platform includes maintaining a list of one or more existing request posts associated with content. The existing request posts are posted by one or more users associated with an interactive broadcast platform. A new request post is received from another user associated with the interactive broadcasting platform with the new request post being associated with the interactive broadcasting platform. Votes are received from a group of users. The group of users include any of the one or more users, the another user, and other non-posting users associated with the online broadcasting platform. The votes are associated with at least one of the one or more existing request posts and the new request post. A score is determined for the existing request posts and for the new request post according to a function that includes the votes received from the group of users.

20 Claims, 5 Drawing Sheets

(56) References Cited

U.S. PATENT DOCUMENTS

2012/0030476 A1   2/2012  Chung
2012/0060176 A1*  3/2012  Chai et al. ...................... 725/10
2012/0116854 A1   5/2012  Phipps
2012/0143914 A1   6/2012  Lang et al.

\* cited by examiner

SYSTEM AND METHOD FOR USER POLLING OVER A NETWORK

CROSS REFERENCE TO RELATED APPLICATIONS

This application is a continuation of U.S. patent application Ser. No. 13/538,858, filed Jun. 29, 2012, which is hereby incorporated by reference herein in its entirety.

FIELD OF THE INVENTION

The present invention relates generally to systems and methods for interactive broadcasting over a network, and more particularly, to an interactive broadcasting system allowing users to generate and vote on requests.

BACKGROUND

Traditional broadcast mediums, such as television and radio, allow very limited interactivity between broadcasters and their audience. Requests from select audience members can be fulfilled in some limited circumstances, such as song requests on radio. However, soliciting and managing requests from an entire audience is difficult.

Solicitation of audience preferences via the Internet has lowered some of the barriers to interactivity between broadcasters and their audience by allowing a more efficient dialogue. Existing online platforms, such as Facebook®, Google+™, YouTube®, Pinterest®, Twitter®, and others, allow voting on broadcast content, such as "tweets", wall posts, and so on.

Votes on existing online platforms are cast on content not directly generated by the audience. Votes are garnered in the form of binary signals such as "+1", "like", and thumbs up/down with the message chosen by the broadcaster and not the audience. Broadcasters such as Facebook also use a "polling" functionality allowing broadcasters to poll an audience with a set of predefined choices. The available choices for such "polling" are designed by the broadcaster.

Each vote in existing online platforms is treated equally. For instance, on platforms such as Facebook, fans can vote (e.g. using the "like" function) for a celebrity's broadcast. Every fan can vote once, and that vote is treated the same as votes cast by others.

SUMMARY OF THE INVENTION

According to one aspect of the present disclosure, a computer-implemented method of user polling associated with an interactive broadcasting platform includes maintaining a list of one or more existing request posts associated with content on said interactive broadcasting platform. The existing request posts have been posted by one or more users associated with the interactive broadcast platform. A new request post is received from another user associated with the interactive broadcasting platform. The new request post is associated with the interactive broadcasting platform. Votes from a group of users is received. The group of users include any of the one or more users, the another user, and other non-posting users associated with the online broadcasting platform. The votes are associated with at least one of the one or more existing request posts and the new request post. A score is determined for the existing request posts and for the new request post according to a function that includes the votes received from the group of users.

According to another aspect of the present disclosure, a server system for user polling includes one or more communication interfaces configured to send and receive data including data received from networked components external to the server system. One or more physical non-transitory computer-readable storage media are configured to store data. One or more memory devices store instructions that, when executed by the at least one or more processors, cause the server system to maintain, on at least one of the one or more computer-readable storage media or on at least one of the one or more memory devices, a list of one or more existing request postings associated with content on a broadcasting platform. The existing request postings have been posted by one or more users associated with the broadcasting platform. A new request post is received via at least one of the one or more communication interfaces from another user associated with the broadcasting platform. The new request posting is associated with content on the broadcasting platform. Votes from a group of users are received via at least one of the one or more communication interfaces. The group of users include any of the one or more users, the another user, and other non-posting users associated with the broadcasting platform. The votes are associated with at least one of the one or more existing request posts and the new request post. A score is determined for the existing request posts and for the new request post according to a function that includes the votes received from the group of users.

According to yet another aspect of the present disclosure, a method includes maintaining, on one or more memory devices, a list of one or more existing request postings related to content on a broadcasting platform. The existing request postings are associated with one or more users of the broadcasting platform. A new request post if received via one or more communication interfaces from another user associated with the broadcasting platform. The new request posting is related to content on the broadcasting platform. Votes from a group of users are received via at least one of the one of the one or more communication interfaces. The group of users include any of the one or more users, the another user, and other non-posting users associated with the broadcasting platform. Each of the votes is associated with at least one of the one or more existing request posts and the new request post. A score is determined via at least one of the one or more processors for the existing request posts and for the new request post according to a function that includes the votes received from the group of users.

According to further aspects of the present disclosure, one or more non-transitory physical machine-readable storage media that include instructions which, when executed by one or more processors, cause the one or more processors to perform the above methods.

Additional aspects of the present disclosure will be apparent to those of ordinary skill in the art in view of the detailed description of various embodiments, which is made with reference to the drawings, a brief description of which is provided below.

BRIEF DESCRIPTION OF THE DRAWINGS

Features and advantages of the present disclosure will become more apparent from the following detailed description of exemplary embodiments thereof taken in conjunction with the accompanying drawings in which.

While the present disclosure is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While the present disclosure is susceptible of embodiment in many different forms, there is shown in the drawings and will herein be described in detail various aspects of the invention with the understanding that the present disclosure is to be considered as an exemplification of the principles of the invention and is not intended to limit the broad aspects of the invention to the aspects illustrated.

It is contemplated that in some technical aspects of the present disclosure a desirable effect for interactive broadcasting systems or methods can be to provide platforms for users or audiences to generate content such as requests that can be voted on by other audience members. It is further contemplated that in some aspects of the present disclosure a desirable effect for interactive broadcasting systems or method can be to provide platforms for select audiences or users to be assigned weights such that votes cast by the select audiences or users have a greater influence on an outcome. In certain aspects, a further desirable effect can be for weighted votes to influence outcomes of user or audience generated content or requests that are voted on by other audience members or users of an online platform.

It is contemplated that in some technical aspects of the present disclosure, methods and systems for implementing processes include soliciting requests from an audience of a broadcaster. The solicited requests can include aspects that allow the broadcaster to generate or present broadcast content to suit the tastes or preferences of the audience or users of the broadcaster's content.

It is further contemplated that is some technical aspects of the present disclosure, systems and methods have the effect of allowing audience members (henceforth referred to as users) to generate new requests and/or vote for previously generated requests. Each request is scored according to final votes. In certain aspects, the vote of each user is weighted depending on the user. As such, vote tallies can favor users deemed to be valued users in the system, while reflecting the preferences of the audience as a whole. Information about the vote tallies can then be used by the broadcaster to select preferred broadcast contents. The systems and methods improve the ability of a broadcaster to satisfy the proffered needs of the users and also lead to broadcaster increasing engagement from its users.

In some aspect of the present disclosure a system includes an online platform that serves users and broadcasters, where users generate requests, and/or vote on requests already generated. The broadcaster can then use the results to fulfill at least some portion of the requests in their broadcasts. Broadcaster can include online interactive broadcasting platforms. Furthermore, in some aspect of the present disclosure it can be desirable for the system to include mechanisms for performing various interactions. For example, a broadcaster can survey a user base for information, such as demographic and preference information that can help the broadcaster understand the user base better that is requesting and voting on the broadcaster's available content. Commercial interactions can also be included, whereby goods or services offered by the broadcaster are purchased by the user. Furthermore, rewards can also be given to the users in return for engaging in such commercial interactions, responding to a survey, voting, or posting a new request that, for example, scores high during user voting or is otherwise distinguishable.

Figure 1:
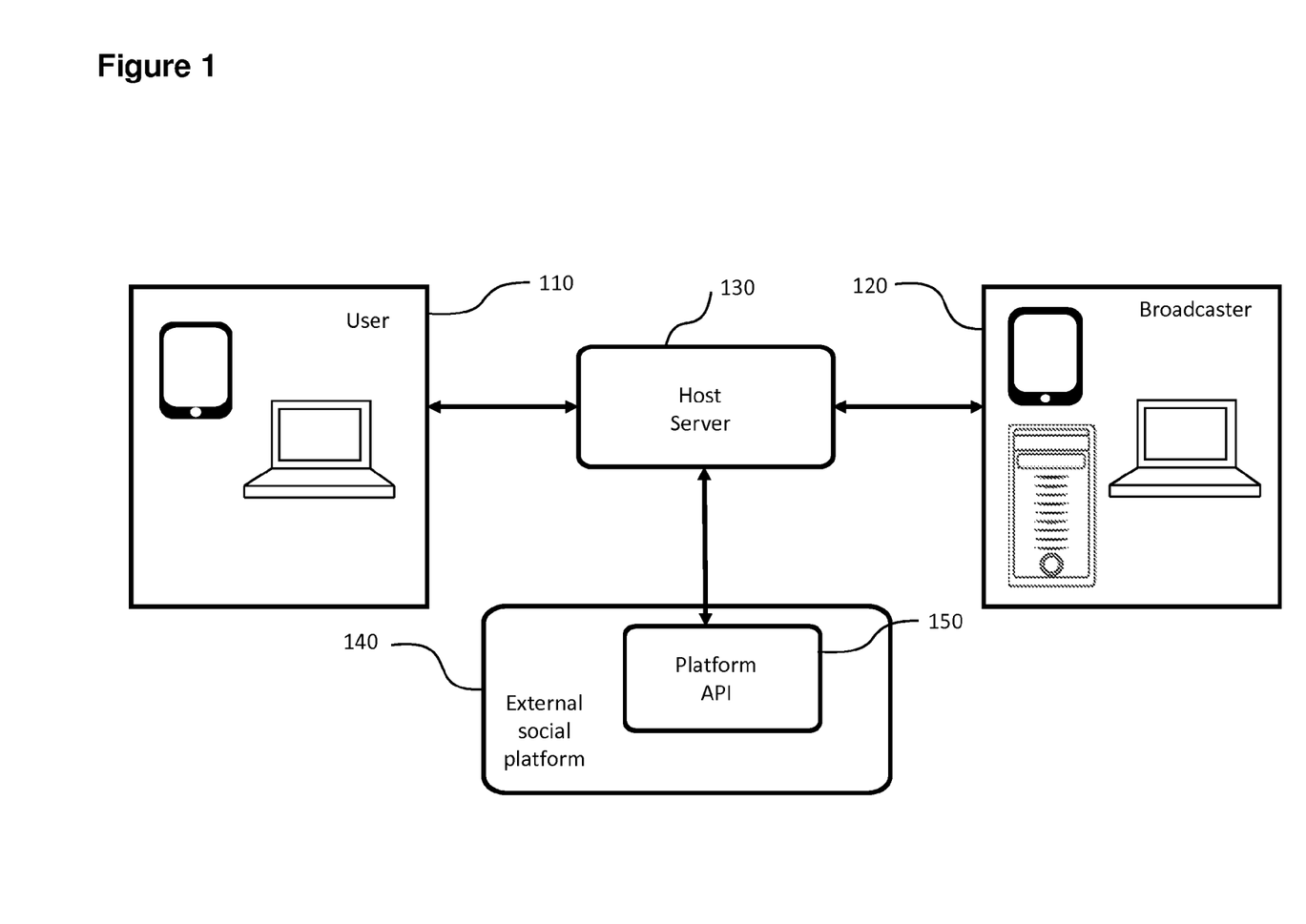
FIG. 1 illustrates an exemplary system for communications between a user and broadcaster via a host server, according to one aspect of the present invention.

Referring now to FIG. 1, a system diagram is illustrated for one non-limiting exemplary aspect of a desirable embodiment aspect contemplated by the present disclosure. Server system 130 represents a host server, or can also represent multiple different servers (e.g., interconnected) facilitating interactions between a user and broadcaster. User block 110 can broadly represent a plurality of internet-connected mobile devices and/or computers and may interchangeably be discussed in the context of a single user or a plurality of users. User block 110, through an individual user of a connected mobile device or computer, can communicate information and perform various activities with a broadcaster 120 through the server system 130. While server system 130 is illustrated as a host server it is contemplated that server system 130 can be integrated or part of a server system that also hosts the broadcaster 120.

It is contemplated that server system 130 can also be connected and communicate with one or more external social platforms 140 (e.g., Facebook, Twitter, Google+) through the external social platform's platform application program interface (API) 150. For example, server system 130 (e.g., through backend server(s) associated with or internal to a host server system) can access a social platform through the social platforms API (e.g., which can reside on backend servers of the platform being accessed). Communications between the server system 130 and platform API 150 can include two-way communications. For example, a user can send or post a lobbying message through server system 130 that then gets posted on a user's social media account through a transmittal of the lobbying message by server system 130 to platform API 150, which processes the lobbying message and posts it to the user's account with the external social platform. Responses (e.g., "likes", votes) to the lobbying message can then be transmitted through the platform API 150 back to the server system 130. Responses can also be extracted or monitored for by server system 130 interacting with the platform API 150 to retrieve any received responses.

The elements illustrated in the system diagram of FIG. 1 can include one or more components including interfaces that allow the illustrated elements to communicate with each other. For example, the broadcaster system 120 and server system 130 can include components that allow the receiving and transmitting between elements or the internal storing and processing of information. The various combinations of components and the hardware associated with the user block 110, broadcaster system, 120, server system 130, externals social platform 140, and platform API 150 will be apparent to those skilled in the field of the present disclosure. For example, components of the system can include various operating systems, at least one or more processing units, one or more storage units, one or more memory units, one or more input devices, one or more output devices, one or more input/output device, one or more bus interfaces, and/or one or more external system interfaces, the configurations of will be apparent to those skilled in the field of the present disclosure.

It is contemplated that in some aspects the broadcaster system 120 can be an independent entity where broadcaster communication(s) with users are processed through the server block 130 (e.g., host server or otherwise) and as such the broadcaster can operate with the same devices as the users (e.g. mobile devices and lap/desktops. It is also contemplated that in some aspects the broadcaster system 120 includes a host server infrastructure, so that it is able to directly communicate with users.

It is contemplated that in some aspects of the systems and methods described herein, an online audience of a broadcaster can solicit broadcast content from a broadcaster, such as available content on the broadcaster's platform or other types of requests including new content or new types of content. For example, solicitation may be implemented through a voting process in which different requests for content are generated by the audience and curated by the system described herein, such as the system illustrated and described in FIG. 1. It is contemplated that in certain aspects, requests can be solicited during a prescribed voting period, after which the final requests are received by the broadcaster along with vote tally information that helps the broadcaster select the best subset of requests to fulfill. Other ordering is contemplated by the present disclosure. For example, requests can be solicited during a portion of a prescribed voting period such that voting is ongoing after a final request is received. The voting can then continue for a predetermined time period after which final requests are then transmitted to the broadcaster along with any scoring or related voting information useful for selecting which subset of requests to fulfill, if any.

The systems and methods for user polling contemplate there being multiple users in the system as broadly represented in the non-limiting example of user block 101 in FIG. 1. Each user in the multi-user system is connected via the Internet to a server implementing a user polling process and each user can enter a new request, such as a request for content from an interactive broadcasting platform, or vote for those requests that were previously entered by that user or other users. Each user can enter a finite number of new requests, and vote for as many of the existing requests as desired. It is contemplated that in certain aspects a user is allowed to vote only once for a given request. In certain aspects a user may or may not be allowed to vote for their own requests.

In some aspects of the systems and methods, users can be assigned or given a weight value that affects the contribution of the user's vote in vote tallies. In some aspects every user may be assigned a weight and in other aspects subset of a larger group of users can be assigned a weight. The weights can also be customized for each individual user. It is contemplated that a default weight for a user unless assigned otherwise may be one. Users with greater weights will cast a larger influence on the vote than those with smaller weights because their votes will generally count for something greater than one vote or the votes from users with small weights will count for something less than one. Requests by users are posted onto a request list that can be viewed by, or otherwise communicated to, other users among a group of user. The requests, including some or all of the requests, can be accompanied by a score value that is a function of the vote tally based on votes received from among the group of users. The score and/or vote tally can be displayed in real-time to the group of users during some or all of the prescribed voting period. It is contemplated that in some aspects it can also be desirable to not display the score or vote tally for request(s), to display a ranking of requests based on the score or vote tally, to display only requests exceeding a certain threshold score or vote tally, to delay displaying an associated score or vote tally until after a prescribed voting period, or combinations thereof.

Voting by users for posted user requests occurs during a finite voting period. Votes for each request can be tallied in real-time or at the end of the voting period, votes for each request can be counted with the final list of requests transmitted to the broadcaster along with scores and/or vote tallies for each request.

In one non-limiting exemplary aspect a score can be a normalized weighted vote count for a posted request. Illustrating this aspect symbolically, let t be the time of voting, and $w_i^t$ a scalar value denoting the weight of user $u_i$ at time t. The vote count of request q is a weighted count given by count(q) $=\sum_{i=1}^{N} w_i^t \cdot \text{vote}(u_i,q)$ where the function vote(u,q) returns 1 if user u votes for request q, and 0 otherwise. While other ways of expressing a score are contemplated, in one aspect the score of request q can be expressed as the normalized count across all requests as given by $$\text{score}(q) = \frac{\text{count}(q)}{\sum_{q'} \text{count}(q')}.$$

In some exemplary aspects the weight of each user, or a select subgroup of users, with respect to a given request can be defined as a function of (i) an "intrinsic value" of the user, and/or (ii) a response from lobbying done by the user, which may also be referred to as a "lobby effect". The intrinsic value of a user can be expressed numerically, or by other quantifiable designations (e.g., a letter grade designation), that reflect a user's value to the broadcaster. The intrinsic value is generally something that is measurable. For example, the intrinsic value of a user to a recording artist may be measured by the amount of artist revenue that the user accounts for. Revenue can be attributed to purchases by the user, and/or purchases by friends of the user on social media platforms. Other non-limiting exemplary measures of intrinsic value are also contemplated, e.g. reward points where a reward scheme underlies interactions between the broadcaster and the users. In some aspects in return for interacting with a broadcaster 120, a user 110 can receive rewards. Such rewards can come in the form of points, which can be redeemed for goods or services offered by the broadcaster 120. A server, such as host server 130, or other type of server(s), can keep track and store the goods or services purchased and/or the points accrued by a user, or information thereon.

The lobby effect discussed above can be used to reflect the degree to which the user's online social connections respond to a call-for-support for the request in question. For example, the user X may post a message on Facebook about a request for X's favorite musician to answer a personal question. The number of responses, such as the number of "likes", can be used to compute a lobby effect that in turn can subsequently be used to boost a user's assigned weight. Illustrating this aspect symbolically, a weight of user $u_i$ applied to request q can be given by the expression $w_i^t(q) = c \cdot l_i(q) + (1-c) \cdot v_i^t$, where $l_i(q)$ denotes the lobby effect achieved by $u_i$ for the request q, and $v_i^t$ is the user's intrinsic value at time t. A scalar value $c \in [0,1]$ is an input parameter that can allow for manual control of how heavily the lobby effect and intrinsic value respectively contribute to the user's weight. Since the weights allow a comparison between users, in some aspects it can be a desirable alternative is to normalize each user weight with respect to the largest user weight. In this way, each user weight conveys a relative value of a user compared to other users.

While other aspects of quantifying a lobby effect are contemplated, in one exemplary aspect it is associated with the number of responses (e.g. the number of likes, thumbs up/down), also referred to as hits. For example, the lobby effect can be quantified by the number of hits can be calculated over all known online social platforms, symbolically expressed as $l_i(q)=\Sigma_s$ hits$(u_i,q,s)$. The value of hits$(u,q,s)$ may be quantified as zero if a user did not lobby for request q on platform s. It is contemplated that in some aspect the value of hits$(u,q,s)$ has no upper-bound. It is also contemplated that hits from certain social platforms may be preferred depending on the subject matter of the request, and thus, the hits from those platforms may be given more weight. For example, requests relating to professional or business matters that have hits from the LinkedIn or Twitter platforms may be given more weighting or have more influence than hits from the Facebook platform.

It is contemplated that in some aspects of the present disclosure lobbying by a user, such as through the communication of lobby message for a user to a social platform, is completed through a server, such as server system 130 (e.g., host server or otherwise). It can be desirable to direct such communications through, for example a host server, to allow tracking of each user's lobby actions and subsequent responses.

Depending on the social platform, whenever a user sends a post (e.g., lobbying message) to a server, such as server system 130 (e.g., host server), a backend server can access the social platform through the social platform's application program interface (API), which resides in the backend servers of the platform in question, and executes the post. Through the API, information can also be collected, such as responses, about the post. For example, when a user posts to Facebook, the server system 130 accesses the user's Facebook account through Facebook's API and displays the post on the user's Facebook account. Through the same API, the number of responses can be extracted at some later time for that post. Similarly, for Twitter, the number of retweets can be collected or extracted for a user's lobbying tweet, as well as other response types such as "add to favorite", via the Twitter API.

It is also contemplated that in some aspects it can be desirable to take different kinds of responses to a user's lobbying activities into account. For example, if a lobby action leads to new users to join the platform in question herein, the lobby effect can symbolically expressed as: $l_i(q)=\Sigma_s$ hits$(u_i,q,s)$+number_of_signups$(u_i,q,s)$. In aspects where it may be desirable to include all types of responses to lobbying actions by a user, the following symbolic expression can be applied: $l_i(q)=\Sigma_s\Sigma_r$ response$_r(u_i,q,s)$ where r indexes the different responses the system may wish to measure or track.

It is also contemplated that to allow the system to favor different kinds of responses, a weighted scheme can be introduced with r denoting response type, and $p_r\in[0,1]$ being a weight for response type r, where the sum of all response weights equal 1. Then, the lobby effect that accounts for the response types of interest can be expressed as $l_i(q)=\Sigma_s\Sigma_r p_r\cdot$response$_r(u_i,q,s)$.

Figure 2:
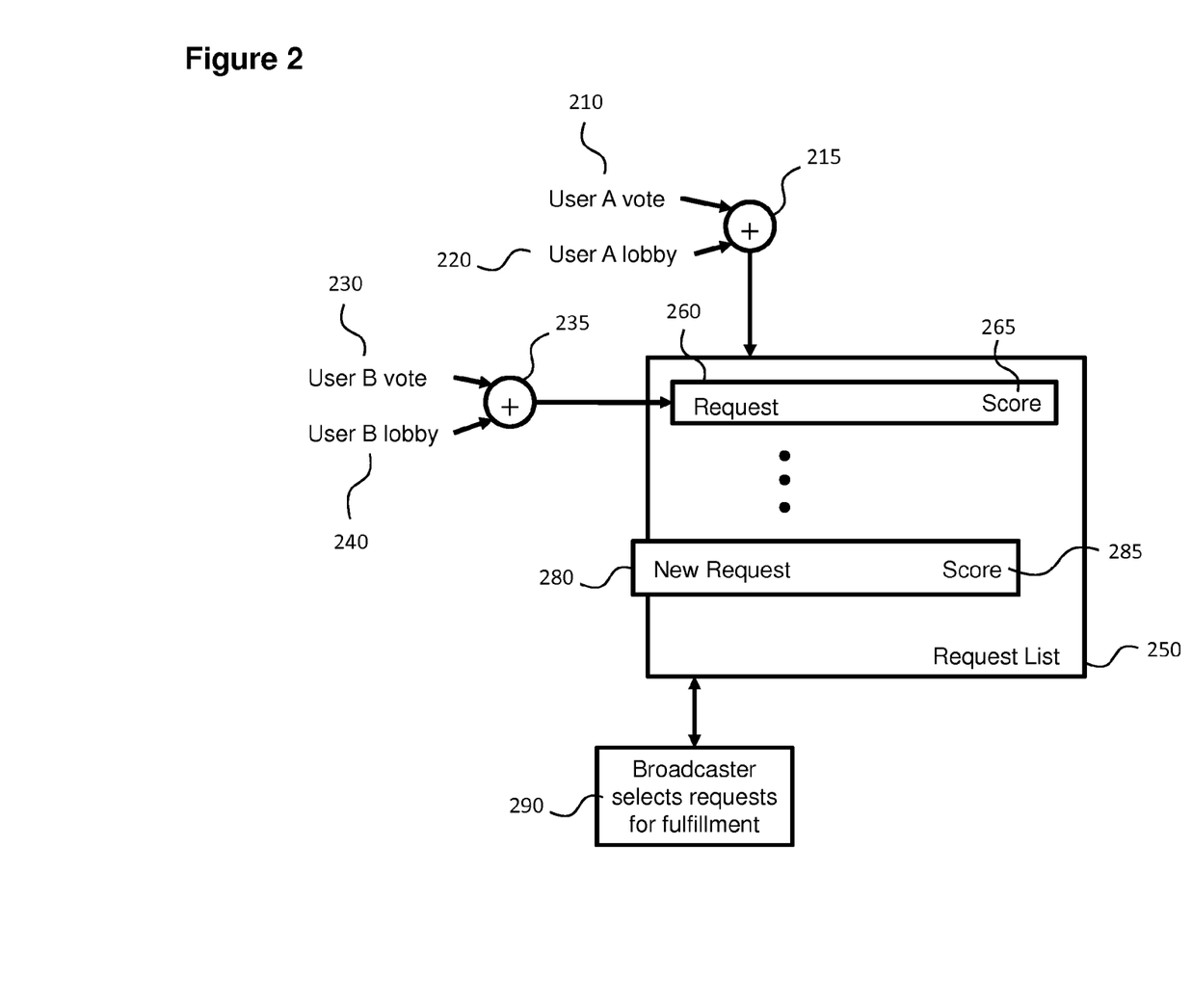
FIG. 2 illustrates an exemplary relationship for users to generate and act upon requests and broadcaster fulfillment thereof, according to one aspect of the present invention.

Referring now to FIG. 2, an exemplary user polling relationship for an aspect of the present disclosure is illustrated including users generating and acting upon requests and a broadcaster's fulfillment thereof. The relationship illustrates a User A who votes 210 and lobbies 220 for a request 260 which has a score 265 based on voting by a group of users including User A. The results of the User A votes and lobbying can be computed (e.g., a summation based on a user's weight including intrinsic value and lobbying effect) in step 215 which subsequently determines the score 265. It is contemplated that User A's lobbying may include lobbying User B for and existing request 260. Furthermore, voting contributes user A's weight to the score 265, as does User A's lobbying. The relationship also illustrates a User B who votes 230 and lobbies 240 for existing request 260 in the same way. The results of the User B votes and lobbying can be computed in step 235 which subsequently also can be used to determine score 265.

The existing request(s) are maintained on a request list 250 that can also include any new requests received as part of the user polling process. For example, User B can also enter a new request 280 to request list 250. The score of new request 280 is initially zero or a null quantity, which eventually changes once vote(s) are cast for new request 280. A final version of the request list 250 can be requested by a broadcaster and/or it can be transmitted based on some predetermined criteria (e.g., automatically transmitted after prescribed voting period ends and scores are determined; in response to broadcaster request)—see, e.g., block 290 which provides an example of a broadcaster selecting requests for fulfillment. The broadcaster fulfillment of the selected requests can then be completed according to the results of the user polling.

Figure 3:
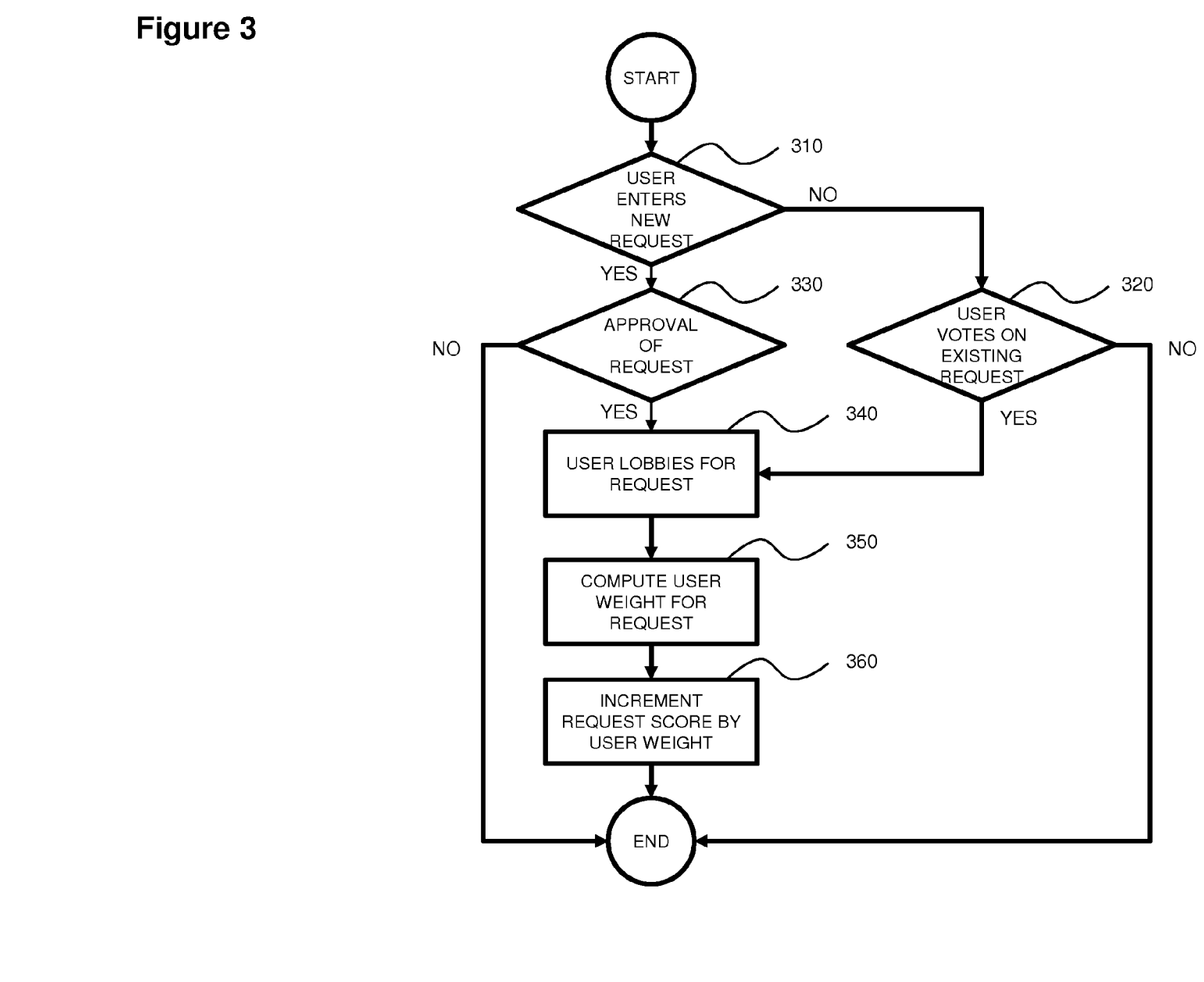
FIG. 3 is an exemplary flow diagram for a user vote process, according to one aspect of the present invention.

Referring now to FIG. 3, an exemplary flow diagram is illustrated for select user actions in a system and method related to new requests and voting associated with user polling. At step 310, a user can choose to enter a new request, such as a request for certain content from a broadcast platform. At step 330, a new request may be subject to approval by an administrator associated with the user polling system, a broadcast platform, or both. If approval is not received, the process ends. If the new request is approved, the new request may be posted and the process proceeds to step 340 where the user can proceed to lobby for the new request or other existing requests. For example, the user can lobby on various social media platforms to increase the weight of the user's vote for the request the user voted. If the user does not enter a new request step 310 proceeds to step 320, where a user can vote on an existing request before proceeding to step 340 and lobbying for the request the user voted. Next at step 350, the user's weight for the request that was lobbied upon is computed based on results received, such as a number of hits for various social media platforms or as otherwise described in the present disclosure. Finally, at step 360, an overall score for the request is determined including any lobby effects. If the user does not lobby, then the lobby effect is zero in the weight calculation.

Figure 4:
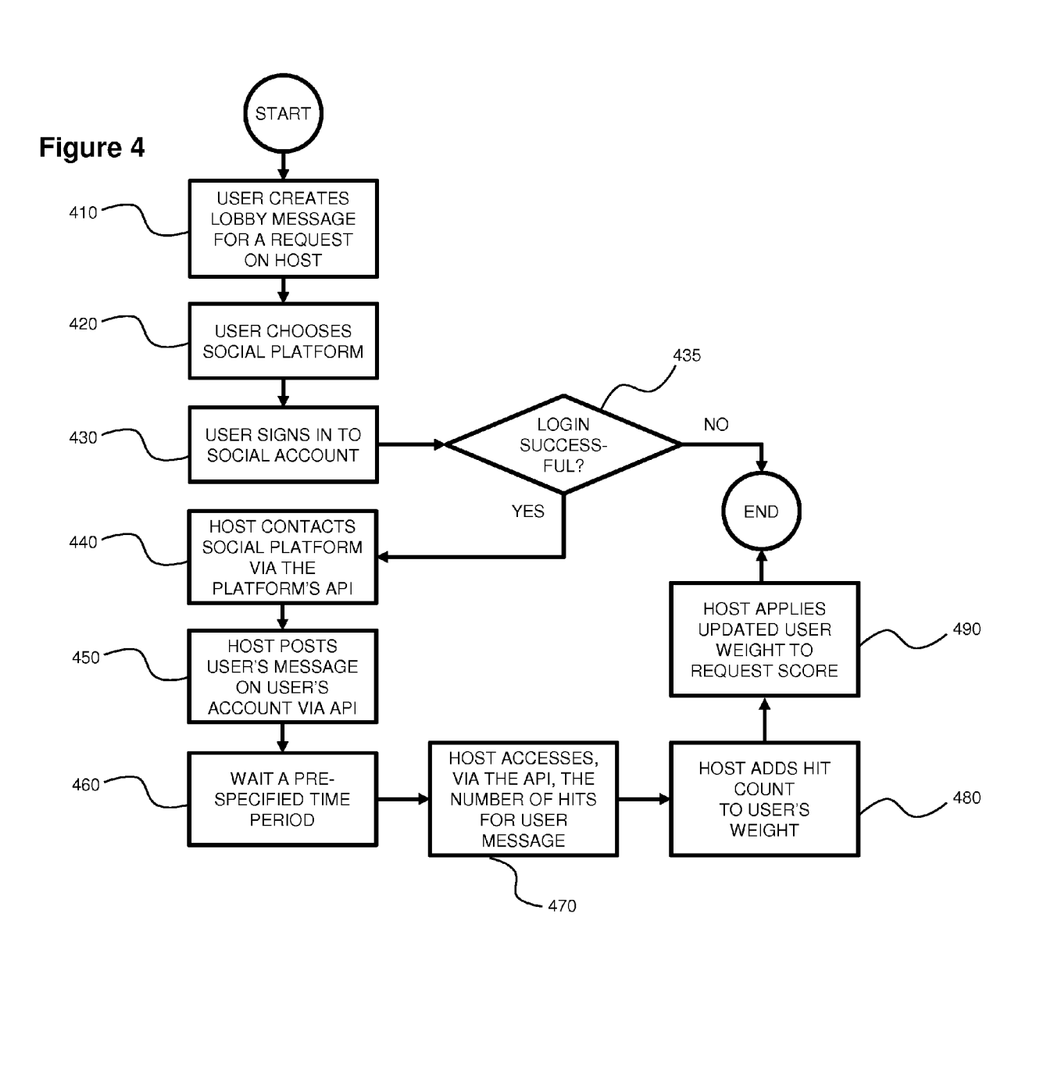
FIGS. 4-5 illustrate exemplary determinations of a lobby effect, according to some aspects of the present invention.
Figure 5:
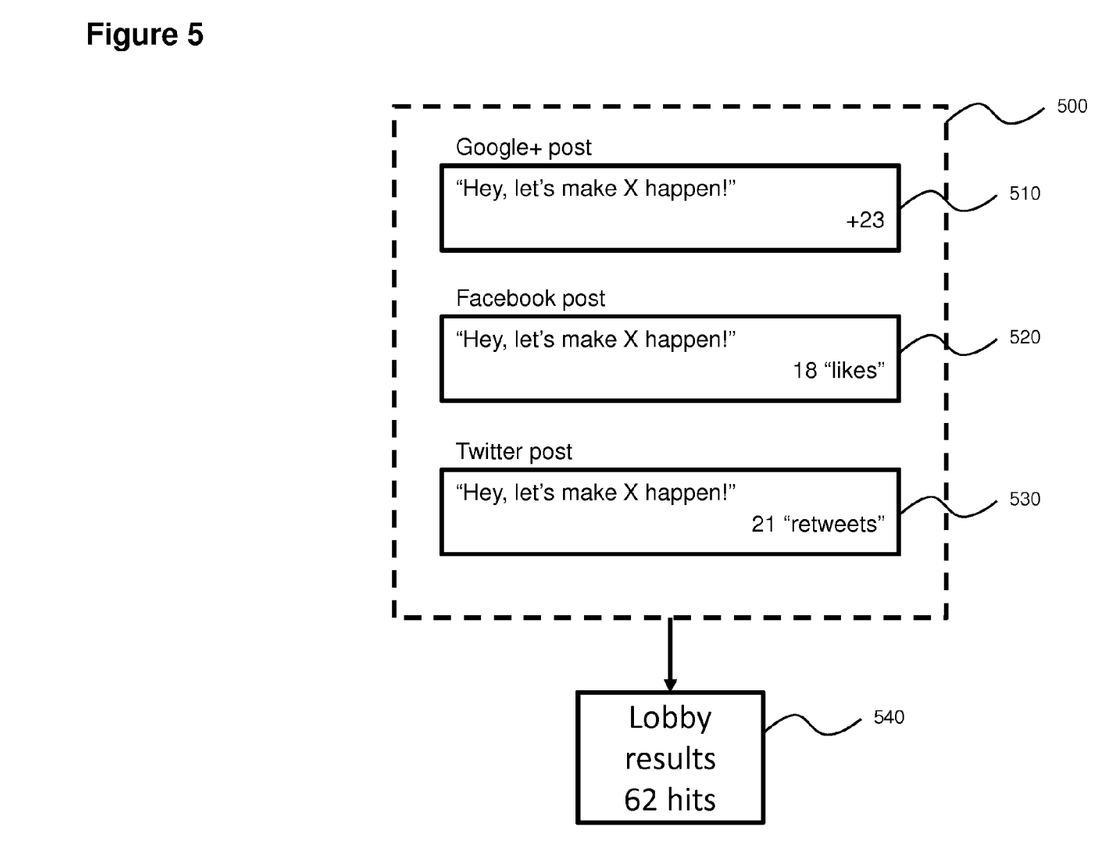

Referring now to FIGS. 4-5, an exemplary relationship for a lobby effect for an exemplary voting process in steps 340 and 350 of FIG. 3 is illustrated. A user can lobby on any of a number of social media platforms. For example, a user can post a lobby message, "Hey, let's make X happen!", to multiple social media platforms, such as Google+, Facebook, and Twitter, and so on. "X" denotes the request of interest the user votes on, including a new request or an existing request. The user's connections on these social media platforms can then provide hits to the user's lobby message.

Further expanding on step 340 from FIG. 3, at step 410 in FIG. 4 a user can create a lobby message for a request on server system 130, such as a host server. Next, at step 420, the user can choose a social platform on which the user wants the lobby message to be posted. Then, at step 430 the user can sign into the user's social platform account(s) (e.g., through the host server or directly). At step 435, if the login is successful, the process moves to step 440 where the host server contacts and sets up a connection with the social platform via the social platform's API. Next, at step 450, the host posts the user's lobby message on the user's social platform account via the social platform's API. Next, at step 460, a user can wait for a predetermined time period and then at step 470 the host server accessed, via the social platform API, the number of hits for a user's lobby message. At step 480, the host server then adds the hit count to the user's weight and then at step 490, applies the updated user weight to a request score, such as scores 265, 285 from FIG. 2. Steps 430, 435, 440, 450, 460, 470, 480, and 490 can be repeated for some or all of the social platforms chosen by the user at step 420.

Response blocks 510, 520, 530 illustrated the various illustrative responses to the lobby message on various social media platforms by the user. Responses 510, 520, 530 include respective hit counts from each of the different platforms based on the activities of the user's connections on each of these social platforms. The responses are referred to as hits herein, and they can aggregate by way of a numeric sum as discussed above. In the specific example presented in FIG. 5 of the more general processes of the present disclosure, summary block 540 shows the result of the aggregation of the responses to the lobby messages from block 500, the exemplary result being 62 hits; the lobby effect of the message is thus 62 in this illustrative example of the more generalized process described herein.

It is contemplated that in some exemplary aspects of the present disclosure, multipliers or weights are assigned to select users of a user polling system. The weights assigned to such select users can then be applied to a vote cast by the select user for certain requested content posted by any one user of a group of users. With a weight applied to the select user's vote, their vote can have a greater influence on scores determined for all the user-posted content requests. Preferred requested content can then be identified based on a ranking of requests by score or categorizing certain requested content falling above a threshold or within a range of scores.

It is contemplated that some aspects of the present disclosure that are described herein are desirable for interactive broadcasting platforms. For example, certain aspects, such as lobbying on social media platforms, can be applied by users to leverage their social media activities to influence outcomes of a user polling process. This allows viral marketing of a broadcaster and concurrently enhances the interests of the users of the user polling system and the broadcaster. Certain aspects are also desirable by allowing crowd-sourcing of user opinions through user votes on posted user requests, and thus, allow each voter or user to contribute in a number of ways including being able to post user requests.

According to one aspect of the present disclosure, a computer-implemented method of user polling associated with an interactive broadcasting platform includes maintaining a list of one or more existing request posts associated with content on said interactive broadcasting platform. The existing request posts have been posted by one or more users associated with the interactive broadcast platform. A new request post is received from another user associated with the interactive broadcasting platform. The new request post is associated with the interactive broadcasting platform. Votes from a group of users is received. The group of users include any of the one or more users, the another user, and other non-posting users associated with the online broadcasting platform. The votes are associated with at least one of the one or more existing request posts and the new request post. A score is determined for the existing request posts and for the new request post according to a function that includes the votes received from the group of users.

According to another aspect of the present disclosure, a server system for user polling includes one or more communication interfaces configured to send and receive data including data received from networked components external to the server system. One or more physical non-transitory computer-readable storage media are configured to store data. One or more memory devices store instructions that, when executed by the at least one or more processors, cause the server system to maintain, on at least one of the one or more computer-readable storage media or on at least one of the one or more memory devices, a list of one or more existing request postings associated with content on a broadcasting platform. The existing request postings have been posted by one or more users associated with the broadcasting platform. A new request post is received via at least one of the one or more communication interfaces from another user associated with the broadcasting platform. The new request posting is associated with content on the broadcasting platform. Votes from a group of users are received via at least one of the one or more communication interfaces. The group of users include any of the one or more users, the another user, and other non-posting users associated with the broadcasting platform. The votes are associated with at least one of the one or more existing request posts and the new request post. A score is determined for the existing request posts and for the new request post according to a function that includes the votes received from the group of users.

According to yet another aspect of the present disclosure, a method includes maintaining, on one or more memory devices, a list of one or more existing request postings related to content on a broadcasting platform. The existing request postings are associated with one or more users of the broadcasting platform. A new request post if received via one or more communication interfaces from another user associated with the broadcasting platform. The new request posting is related to content on the broadcasting platform. Votes from a group of users are received via at least one of the one of the one or more communication interfaces. The group of users include any of the one or more users, the another user, and other non-posting users associated with the broadcasting platform. Each of the votes is associated with at least one of the one or more existing request posts and the new request post. A score is determined via at least one of the one or more processors for the existing request posts and for the new request post according to a function that includes the votes received from the group of users.

Addition aspects of the above systems and methods include one or more of the following in various combinations. The systems and methods can include determining a preferred request outcome from the one or more existing request posts and the new request post, where the preferred request outcome is a request post receiving a highest determined score. The systems and methods can also include transmitting, sending, or outputting the preferred request outcome from a first server connected to a network, where the preferred request outcome is configured for receipt by a second server associated the interactive broadcasting platform. The systems and methods can also include one or more existing request posts and the new request post having user preferences for specific content on the interactive broadcasting platform. The systems and methods can also include each received vote for each of the request posts being identifiable to only one user from the group of users such that user can vote no more than once for each request post. The systems and methods can also include determining a weight for increasing a score for at least one request post, where the weight is based on a vote received for the at least one requested post that is associated with a select user from the group of users. The systems and methods can also include monitoring one or more social media platforms identifiable with at least some of the group of users for positive responses to lobbying posts by a user of the at least some of the group of users, where the lobbying posts are associated with one of the request posts for which a vote was received associated with the user; and in response to receiving the positive responses, determining a weight for increasing a score for the one of the request posts, where the weight is based on a quantity of the positive responses. The systems and methods can also include transmitting, sending, or outputting an inquiry to the group of users, where the inquiry includes a survey requesting information. The systems and methods can also include receiving a response from at least one user of the group of users, where the response is associated with the inquiry. The systems and methods can also include determining one or more subgroups of users from the group of users, where eligibility for the subgroup of users is based on a new request or a vote being associated with a user; and transmitting, sending, or outputting one or more reward messages to the subgroup of users, where the reward message is associated with one or more rewards. The systems and methods can also include at least some of the request posts and the votes from the group of users being received via transmissions from mobile devices associated with a wireless network.

According to further aspects of the present disclosure, one or more non-transitory physical machine-readable storage media that include instructions which, when executed by one or more processors, cause the one or more processors to perform the above methods.

According to further aspects of the present disclosure, communication interfaces for the transmitting, outputting, sending, and/or receiving of information is contemplated for the above methods and systems.

Each of these embodiments and obvious variations thereof is contemplated as falling within the spirit and scope of the claimed invention, which is set forth in the following claims.

What is claimed is:

1. A computer-implemented method of user polling associated with an interactive broadcasting platform, the method comprising:
   maintaining a list of one or more existing request posts associated with content on an interactive broadcasting platform, said existing request posts having been posted by one or more users associated with said interactive broadcast platform;
   receiving a new request post from another user associated with said interactive broadcasting platform, said new request post associated with said interactive broadcasting platform;
   receiving votes from a group of users, said group of users including any of said one or more users, said another user, and other non-posting users associated with said interactive broadcasting platform, said votes being associated with at least one of said one or more existing request posts and said new request post;
   determining a score, for said existing request posts and for said new request post, according to a function that includes said votes received from said group of users;
   monitoring one or more social media platforms identifiable with at least some of said group of users for positive responses to lobbying posts by a user from said at least some of said group of users, said lobbying posts comprising calls for support, said lobbying posts being associated with one of said request posts for which a vote was received associated with said user; and
   in response to receiving said positive responses, determining a weight for increasing said score for said one of said request posts, said weight based on a quantity of said positive responses.

2. The method of claim 1, further comprising determining a preferred request outcome from said one or more existing request posts and said new request post, said preferred request outcome being a request post receiving a highest determined score.

3. The method of claim 2, further comprising transmitting said preferred request outcome from a first server connected to a network, said preferred request outcome being configured for receipt by a second server associated with said interactive broadcasting platform.

4. The method of claim 1, wherein said one or more existing request posts and said new request post include user preferences for specific content on said interactive broadcasting platform.

5. The method of claim 1, wherein each received vote for each of said request posts is identifiable to only one user from said group of users such that user can vote no more than once for each request post.

6. The method of claim 1, further comprising transmitting an inquiry to said group of users, said inquiry including a survey requesting information.

7. The method of claim 6, further comprising receiving a response from at least one user of said group of users, said response associated with said inquiry.

8. The method of claim 1, further comprising:
   determining one or more subgroups of users from said group of users, eligibility for said subgroup of users based on a new request or a vote being associated with a user; and
   transmitting one or more reward messages to said subgroup of users, said reward message being associated with one or more rewards.

9. A server system for user polling, the server system comprising:
   one or more communication interfaces configured to send and receive data including data received from networked components external to said server system;
   one or more physical non-transitory computer-readable storage media configured to store data; and
   one or more memory devices storing instructions that, when executed by the at least one or more processors, cause the server system to perform acts comprising:
   maintain, on at least one of said one or more computer-readable storage media or on at least one of said one or more memory devices, a list of one or more existing request posts associated with content on a broadcasting platform, said existing request posts having been posted by one or more users associated with said broadcasting platform;
   receive, via at least one of said one or more communication interfaces, a new request post from another user associated with said broadcasting platform, said new request post associated with content on said broadcasting platform;
   receive, via at least one of said one or more communication interfaces, votes from a group of users, said group of users including any of said one or more users, said another user, and other non-posting users associated with said broadcasting platform, said votes being associated with at least one of said one or more existing request posts and said new request post;

determining a score, for said existing request posts and for said new request post, according to a function that includes said votes received from said group of users;

monitoring one or more social media platforms identifiable with at least some of said group of users for positive responses to lobbying posts by a user from said at least some of said group of users, said lobbying posts comprising calls for support, said lobbying posts being associated with one of said request posts for which a vote was received associated with said user; and in response to receiving said positive responses, determining a weight for increasing said score for said one of said request posts, said weight based on a quantity of said positive responses.

10. The system of claim 9, wherein said one or more memory devices store instructions that, when executed by the at least one or more processors, cause the server system to perform acts further comprising determining a preferred request outcome from said one or more existing request posts and said new request post, said preferred request outcome being a request post receiving a highest determined score.

11. The system of claim 10, wherein said one or more memory devices store instructions that, when executed by the at least one or more processors, cause the server system to perform acts further comprising transmitting said preferred request outcome from a first server connected to a network, said preferred request outcome being configured for receipt by a second server associated with said broadcasting platform.

12. The system of claim 9, wherein said one or more existing request posts and said new request post include user preferences for specific content on said broadcasting platform.

13. The system of claim 9, wherein each received vote for each of said request posts is identifiable to only one user from said group of users such that user can vote no more than once for each request post.

14. The system of claim 9, wherein at least some of said request posts and said votes from said group of users are received via transmissions from mobile devices associated with a wireless network.

15. The system of claim 9, wherein said one or more memory devices store instructions that, when executed by the at least one or more processors, cause the server system to perform acts further comprising determining one or more subgroups of users from said group of users, eligibility for said subgroup of users based on a new request or a vote being associated with a user; and transmitting one or more reward messages to said subgroup of users, said reward message being associated with one or more rewards.

16. One or more physical non-transitory machine-readable storage media including instructions which, when executed by one or more processors, cause the one or more processors to perform operations comprising:

maintaining, on one or more memory devices, a list of one or more existing request posts related to content on a broadcasting platform, said existing request posts associated with one or more users of said broadcasting platform;

receive, via one or more communication interfaces, a new request post from another user associated with said broadcasting platform, said new request post related to content on said broadcasting platform;

receive, via at least one of said one of said one or more communication interfaces, votes from a group of users, said group of users including any of said one or more users, said another user, and other non-posting users associated with said broadcasting platform, each of said votes being associated with at least one of said one or more existing request posts and said new request post;

determining, via at least one of said one or more processors, a score for said existing request posts and for said new request post, according to a function that includes said votes received from said group of users;

monitoring one or more social media platforms identifiable with at least some of said group of users for positive responses to lobbying posts by a user from said at least some of said group of users, said lobbying posts comprising calls for support, said lobbying posts being associated with one of said request posts for which a vote was received associated with said user; and in response to receiving said positive responses, determining a weight for increasing said score for said one of said request posts, said weight based on a quantity of said positive responses.

17. The one or more non-transitory physical machine-readable storage media of claim 16, including instructions which cause the one or more processors to perform operations further comprising determining a preferred request outcome from said one or more existing request posts and said new request post, said preferred request outcome being a request post receiving a highest weighted score.

18. The one or more non-transitory physical machine-readable storage media of claim 17, including instructions which cause the one or more processors to perform operations further comprising transmitting said preferred request outcome from a first server connected to a network, said preferred request outcome being configured for receipt by a second server associated with said interactive broadcasting platform.

19. The one or more non-transitory physical machine-readable storage media of claim 16, wherein said one or more existing request posts and said new request post include user preferences for specific content on said broadcasting platform.

20. The one or more non-transitory physical machine-readable storage media of claim 16, wherein each received vote for each of said request posts is identifiable to only one user from said group of users such that user can vote no more than once for each request post.

* * * * *